United States Patent
Brennan et al.

(10) Patent No.: US 9,573,833 B2
(45) Date of Patent: Feb. 21, 2017

(54) METHOD AND LIFT JET FLOATATION SYSTEM FOR SHAPING THIN GLASS

(71) Applicant: CORNING INCORPORATED, Corning, NY (US)

(72) Inventors: Michael Timothy Brennan, Painted Post, NY (US); Anurag Jain, Painted Post, NY (US); William Edward Lock, Horseheads, NY (US); Michael John Moore, Corning, NY (US); Larry Gene Smith, Tulsa, OK (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/668,245

(22) Filed: Mar. 25, 2015

(65) Prior Publication Data

US 2015/0274575 A1 Oct. 1, 2015

Related U.S. Application Data

(60) Provisional application No. 61/972,784, filed on Mar. 31, 2014.

(51) Int. Cl.
| | | |
|---|---|---|
| *C03B 35/18* | (2006.01) | |
| *C03B 23/03* | (2006.01) | |
| *C03B 35/16* | (2006.01) | |
| *C03B 23/035* | (2006.01) | |
| *C03B 35/24* | (2006.01) | |

(52) U.S. Cl.
CPC ............. *C03B 23/03* (2013.01); *C03B 23/035* (2013.01); *C03B 23/0357* (2013.01); *C03B 35/16* (2013.01); *C03B 35/18* (2013.01); *C03B 35/24* (2013.01)

(58) Field of Classification Search
CPC .......... C03B 35/24; C03B 35/18; C03B 36/16; C03B 23/03; C03B 18/22
USPC ................................................ 65/25.4, 182.1
See application file for complete search history.

(56) References Cited

U.S. PATENT DOCUMENTS

| | | |
|---|---|---|
| 1,960,222 A | 5/1934 | Long |
| 4,767,437 A | 8/1988 | Lampman et al. |
| 5,094,678 A | 3/1992 | Kramer et al. |
| 5,147,439 A | 9/1992 | Ritz |
| 5,286,271 A | 2/1994 | Rueter et al. |
| 5,403,369 A | 4/1995 | McMaster |
| 5,507,852 A | 4/1996 | Frank et al. |
| 7,107,792 B2 | 9/2006 | Langsdorf et al. |
| 7,866,186 B2 | 1/2011 | Funk et al. |
| 7,908,885 B2 | 3/2011 | Devitt |
| 8,132,428 B2 | 3/2012 | Vild et al. |
| 8,986,072 B2 | 3/2015 | Darcangelo et al. |
| 2003/0014997 A1 | 1/2003 | Dunifon |
| 2012/0094084 A1 | 4/2012 | Fisher et al. |
| 2012/0328843 A1 | 12/2012 | Cleary et al. |
| 2013/0086948 A1 | 4/2013 | Bisson et al. |
| 2013/0125589 A1 | 5/2013 | Dannoux et al. |
| 2013/0125592 A1 | 5/2013 | Bisson et al. |
| 2013/0127202 A1 | 5/2013 | Hart |
| 2013/0295357 A1 | 11/2013 | Cleary et al. |
| 2013/0319046 A1 | 12/2013 | Cleary et al. |
| 2013/0323415 A1 | 12/2013 | Brackley et al. |
| 2014/0087159 A1 | 3/2014 | Cleary et al. |
| 2014/0087193 A1 | 3/2014 | Cites et al. |
| 2014/0141217 A1 | 5/2014 | Gulati et al. |
| 2014/0239034 A1 | 8/2014 | Cleary et al. |
| 2014/0356604 A1 | 12/2014 | Borrelli et al. |
| 2015/0064374 A1 | 3/2015 | Jain et al. |
| 2015/0111016 A1 | 4/2015 | Fisher et al. |
| 2015/0122406 A1 | 5/2015 | Fisher et al. |
| 2015/0132538 A1 | 5/2015 | Cleary et al. |
| 2015/0140301 A1 | 5/2015 | Fisher et al. |
| 2015/0158275 A1 | 6/2015 | D'Errico et al. |
| 2015/0158277 A1 | 6/2015 | Fisher et al. |
| 2015/0232366 A1 | 8/2015 | Fredholm et al. |
| 2015/0232367 A1 | 8/2015 | Joubaud et al. |
| 2015/0251377 A1 | 9/2015 | Cleary et al. |
| 2015/0274571 A1* | 10/2015 | Brennan .................. C03B 23/03 65/25.4 |
| 2015/0321940 A1 | 11/2015 | Dannoux et al. |
| 2016/0082705 A1 | 3/2016 | Fisher et al. |
| 2016/0145139 A1 | 5/2016 | Fredholm et al. |

FOREIGN PATENT DOCUMENTS

| | | |
|---|---|---|
| EP | 0265787 A1 | 5/1988 |
| EP | 0968970 A2 | 1/2000 |
| EP | 1580171 A1 | 9/2005 |
| GB | 2033251 A | 5/1980 |
| JP | 2001158631 | 6/2001 |
| JP | 2002173332 A | 6/2002 |
| JP | 2004051404 A | 2/2004 |
| WO | 2007050053 A1 | 5/2007 |
| WO | 2015031148 A1 | 3/2015 |
| WO | 2015031151 A1 | 3/2015 |
| WO | 2015031594 A2 | 3/2015 |
| WO | 2015054112 A1 | 4/2015 |

OTHER PUBLICATIONS

JP 2004-026546, Miyamoto Takayuki, Jan. 2004, machine translation.*
JP 2001-039724, Nishitani, Masami, Feb. 2001, machine translation.*
International Search Report and Written Opinion PCT/US2015/022995 Dated Jun. 19, 2015.

* cited by examiner

*Primary Examiner* — Mark Halpern
(74) *Attorney, Agent, or Firm* — Payal A. Patel

(57) ABSTRACT

Disclosed herein are systems for shaping a glass sheet comprising a roll conveyor comprising a plurality of rollers for conveying the glass sheet along a plane; a lift jet array comprising a plurality of nozzles, one or more of the plurality of nozzles comprising a tip having a plurality of orifices; and a shaping mold located above the roll conveyor, wherein the lift jet array is positioned below the roll conveyor such that each nozzle tip is located above the centerline of the plurality of rollers. Also disclosed herein are methods for shaping a glass sheet comprising heating the glass sheet and conveying the glass sheet on a roll conveyor to a position between the lift jet array and the shaping mold, wherein gas flows from the lift jet array with a force sufficient to lift the glass sheet from the roll conveyor.

7 Claims, 3 Drawing Sheets

METHOD AND LIFT JET FLOATATION SYSTEM FOR SHAPING THIN GLASS

CROSS-REFERENCE TO RELATED APPLICATIONS

This application claims the benefit of priority under 35 U.S.C. §119 of U.S. Provisional Application Ser. No. 61/972,784 filed on Mar. 31, 2014 the content of which is relied upon and incorporated herein by reference in its entirety.

FIELD OF THE DISCLOSURE

The disclosure relates generally to methods and systems for shaping glass sheets, and more particularly to lift jet floatation systems for bending thin glasses.

BACKGROUND

The ability to thermally shape and form thin glass sheets is increasingly relevant to various industries, such as the automotive industry. The production of glass panes for automobiles is a complex process, which is constantly changing due to increasingly stringent environmental and safety requirements. The demand for intricate glass shapes with high optical quality and low weight is growing as governmental regulations require increased fuel economy and reduced emissions. The ability to make automotive parts from thinner glasses may translate to lower vehicle weight, improved fuel economy, reduced emissions, and/or improved vehicle weight distribution (e.g., lower center of gravity).

Prior art methods for shaping glass include placing glass sheets on a roll conveyor, conveying the glass through a furnace to heat and soften the sheets, and positioning the softened glass below a shaping mold, where it is lifted upward by a lift jet array to contact the shaping mold. The shaping mold serves as a surface around which the glass sheet can be formed to the desired shape. The lift jet array pattern is typically different for different shapes and/or parts and may include non-adjustable, fixed diameter/orifice nozzles and/or adjustable threaded nozzles. The nozzles are positioned below the rollers and blow controlled and focused streams of heated air up between the rollers.

Conventional lift jet systems work well with traditional glasses, which are thicker, such as soda-lime glasses having a thickness ranging from about 3 mm to about 6 mm. Thicker glass sheets can generally withstand the pressure from the nozzles without suffering from local deformations. However, when thinner glasses (e.g., thicknesses less than about 3.0 mm, between about 0.3 mm and about 2.0 mm, between about 0.5 mm and about 1.5 mm, and all ranges and subranges therebetween) are processed using these traditional lift jet systems, the glass tends to distort and bend between each nozzle due to the localized upward force from the nozzles.

Accordingly, it would be advantageous to provide methods and systems for shaping and tempering thinner glass sheets, more specifically a lift jet array that more evenly distributes the upward lifting force over a greater surface area so as to reduce and/or eliminate glass distortion. To reduce manufacturing costs and/or processing times, it would additionally be advantageous to provide a system that can function, at least in part, in conjunction with existing systems for bending and tempering traditional (e.g., thicker) glasses.

SUMMARY

The disclosure relates, in various embodiments, to a lift jet floatation system for shaping a glass sheet comprising a roll conveyor comprising a plurality of rollers for conveying the glass sheet along a plane, the plurality of rollers having a centerline substantially parallel to the plane; a lift jet array comprising a plurality of nozzles, one or more of the plurality of nozzles comprising a tip having a plurality of orifices; and a shaping mold, wherein the roll conveyor is positioned substantially between the lift jet array and the shaping mold, and wherein the lift jet array is positioned such that each nozzle tip is located above the centerline of the plurality of rollers.

The disclosure also relates to methods for shaping a glass sheet comprising conveying the glass sheet along a plane on a roll conveyor comprising a plurality of rollers, the plurality of rollers having a centerline substantially parallel to the plane; heating the glass sheet; and positioning the glass sheet on the roll conveyor between a shaping mold and a lift jet array, wherein the lift jet array comprises a plurality of nozzles, one or more of the plurality of nozzles comprising a tip having a plurality of orifices, and wherein the lift jet array is positioned substantially below the roll conveyor such that each nozzle tip is located above the centerline of the plurality of rollers, and wherein a stream of gas flows from each orifice in the lift jet array with a combined force sufficient to lift the glass sheet from the roll conveyor.

The disclosure further relates to a system for lifting or shaping a glass sheet comprising a roll conveyor comprising a plurality of rollers for conveying the glass sheet along a plane, the plurality of rollers having a centerline substantially parallel to the plane, and an array of lift nozzles, each array comprising a plurality of nozzles, one or more of the plurality of nozzles comprising a tip having a plurality of orifices; wherein each nozzle tip is located above the centerline of the plurality of rollers.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Disclosed herein is a lift jet floatation system for shaping a glass sheet comprising a roll conveyor comprising a plurality of rollers for conveying the glass sheet along a plane, the plurality of rollers having a centerline substantially parallel to the plane; a lift jet array comprising a plurality of nozzles, one or more of the plurality of nozzles comprising a tip having a plurality of orifices; and a shaping mold, wherein the roll conveyer is positioned substantially between the lift jet array and the shaping mold, and wherein the lift jet array is positioned substantially below the roll conveyor such that each nozzle tip is located above the centerline of the plurality of rollers.

Also disclosed herein is a system for lifting or shaping a glass sheet comprising a roll conveyor comprising a plurality of rollers for conveying the glass sheet along a plane, the plurality of rollers having a centerline substantially parallel to the plane, and an array of lift nozzles, each array comprising a plurality of nozzles, one or more of the plurality of nozzles comprising a tip having a plurality of orifices; wherein each nozzle tip is located above the centerline of the plurality of rollers.

Lift Jet System

Figure 1:
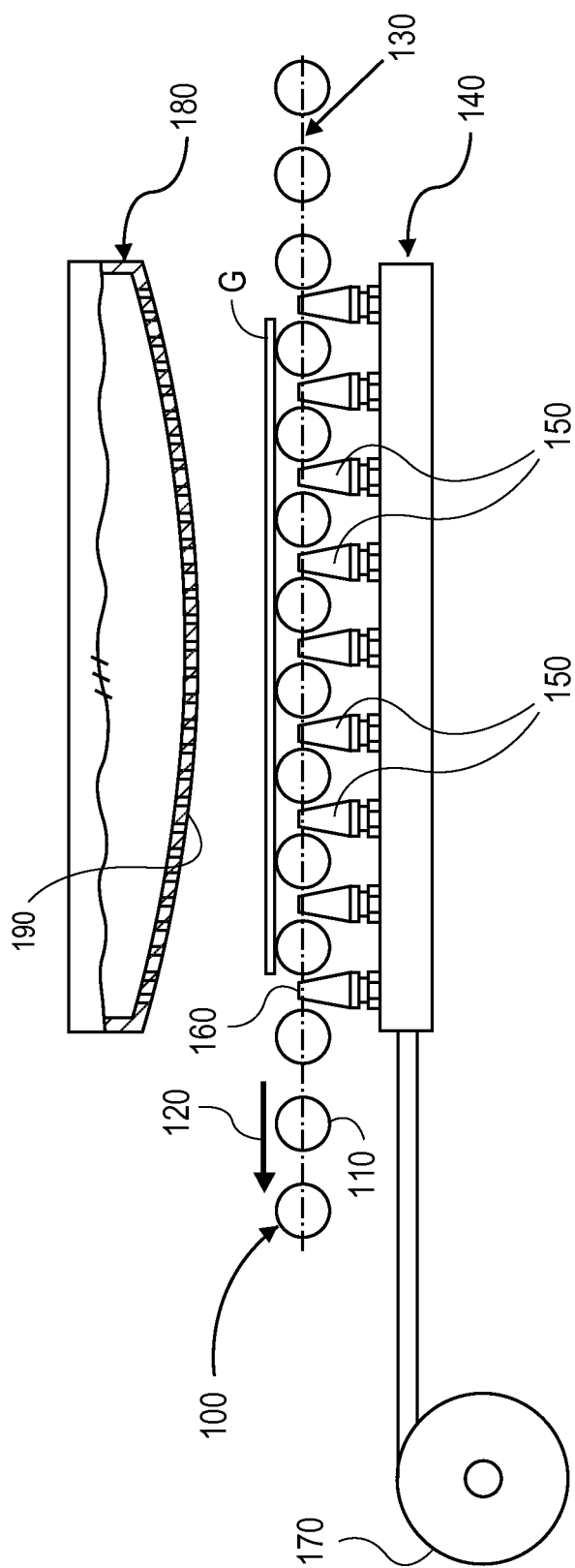
FIG. 1 is a side view illustrating a jet lift floatation system according to one embodiment of the disclosure.

With reference to FIG. 1, one embodiment of a lift jet floatation system is illustrated, which comprises a roll conveyor 100 having a plurality of rollers 110 on which glass sheets G may be conveyed along a directional plane 120. The glass sheet may be conveyed through a furnace or other heating means (not illustrated) or any other suitable means may be used to soften the glass sheet prior to shaping. According to various embodiments, the glass sheet may be heated to a temperature at which the sheet can be shaped or molded.

The plurality of rollers has a centerline 130 which is substantially parallel to the plane 120. A lift jet array 140 may be located below the roll conveyor and includes a plurality of nozzles 150, each nozzle comprising a tip 160 having a plurality of orifices. FIGS. 3A-C provide detailed illustrations of the nozzle orifices. The lift jet array is positioned such that each nozzle tip 160 is located between the rollers 110 and above the centerline 130. The position of the nozzles 150 is more particularly illustrated in FIG. 2.

The glass sheet G may be conveyed and positioned under a shaping mold 180 and above the lift jet array 140. The nozzles 150 may supply an upward gas flow to the glass sheet. Pressurized gas, which may be chosen from any gas including, but not limited to, air, may be provided to the lift jet array 140 from a suitable source 170. The glass sheet G may be lifted up from the roll conveyor 100 by the flow of gas from the nozzles 150 and brought into contact with the downward facing surface 190 of the shaping mold 180. The shaping mold 180 may comprise one or more openings (not illustrated) through which a vacuum may optionally be drawn to support the glass sheet received from the conveyor.

According to various embodiments, the lift jet array 140 may comprise one or more nozzles 150 comprising a tip 160 having a plurality of orifices. In other embodiment, each nozzle 150 comprises a tip 160 having a plurality of orifices. According to further embodiments, the nozzles 150 may be identical. In still further embodiments, one or more of the plurality of nozzles 150 in the array has a distribution of orifices different from an adjacent nozzle.

Figure 2:
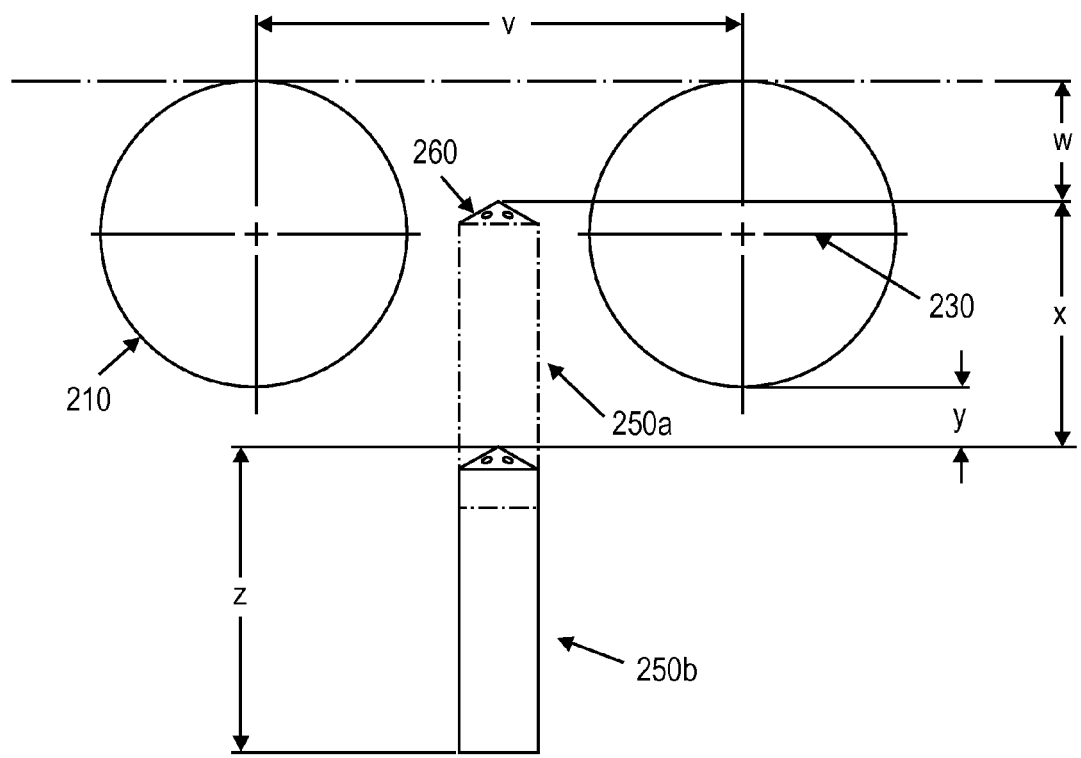
FIG. 2 is a graphical illustration of a nozzle as originally installed and as positioned according to one embodiment of the disclosure.
Figure 3A:
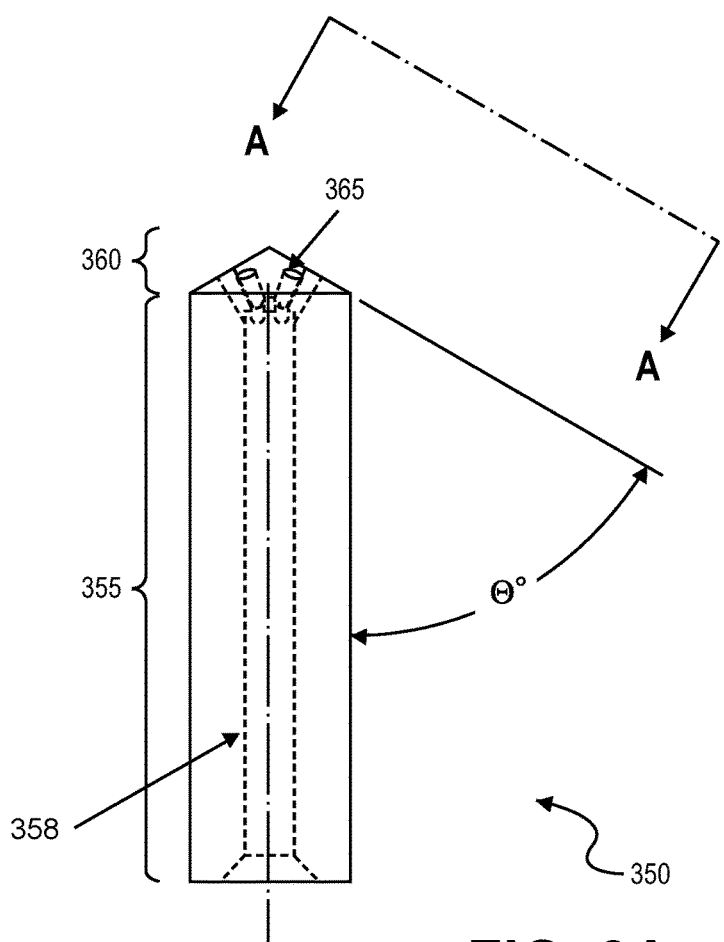
FIG. 3A is a side view illustrating a nozzle having a plurality of orifices according to one embodiment of the disclosure.
Figure 3B:
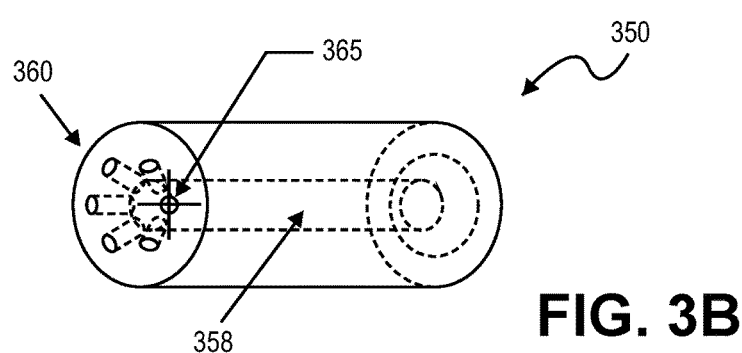
FIG. 3B is an elevational view along the line A-A in FIG. 3A, illustrating a nozzle having a plurality of orifices according to one embodiment of the disclosure.
Figure 3C:
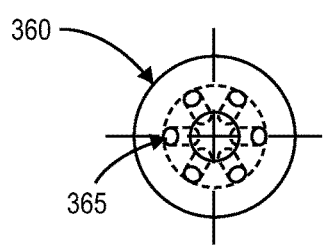
FIG. 3C is a top view illustrating a nozzle having a plurality of orifices according to one embodiment of the disclosure.

FIG. 2 is a graphical illustration of a jet nozzle configured according to one aspect of the disclosure and positioned according to one embodiment of the disclosure 250a (position "a") and a nozzle configured according to one embodiment of the disclosure but positioned as initially installed 250b (position "b"). In certain embodiments, after installation the nozzle array of the instant disclosure may be elevated to position "a," such that the nozzle tips are above the roller centerline 230. Pre-existing systems may employ prior art lift jet arrays which can be installed and removed, e.g., by sliding on rails into position under the conveyor. According to various aspects of the disclosure, the lift jet array disclosed herein can be similarly installed and removed using the pre-existing rails (position "b") and then elevated by any method such that the nozzle tips are between the rollers and above the roller centerline as disclosed herein (position "a"). Alternatively, instead of raising the entire lift jet array, the nozzles themselves may be vertically adjustable, e.g., they may be designed to "pop up" during use, such that the nozzle tips are located above the centerline.

As illustrated in FIG. 2, the pitch v of the rollers 210 represents the distance between the rollers as measured from the center of each roller. The pitch v may vary depending on the conveyor. In certain embodiments, the pitch v may range from about 2 inches to about 8 inches, for example, from about 3 inches to about 6 inches, or about 4 inches, including all ranges and subranges therebetween. The nozzles 250 may be positioned, according to various embodiments, such that the nozzle tips 260 are above the centerline 230 and a distance w from the tops of the rollers. The distance w may also vary and may, in certain embodiments, range from about 0.5 inches to about 4 inches, such as from about 1 inch to about 2 inches, including all ranges and subranges therebetween. The distance x between installation position "b" and elevated position "a" may vary and may, in various embodiments, range from about 1 inch to about 4 inches, such as from about 2 inches to about 3 inches, including all ranges and subranges therebetween. Upon installation the nozzles in position "b" may be below the rollers, e.g., a distance y from the bottoms of the rollers. This distance y may also vary and may, in certain embodiments, range from about 0.5 inches to about 2 inches, for example, from about 1 inch to about 1.5 inches, including all ranges and subranges therebetween. The nozzle 250 may furthermore have any dimensions, such as a total nozzle length z, which may vary and may range, for example, from about 1 inch to about 4 inches, such as from about 2 inches to about 3.5 inches, or from about 2.5 inches to about 3 inches, including all ranges and subranges therebetween.

It should be noted that position "b" may also correspond to the prior art nozzle positioning, although the prior art nozzles in such an instance comprise only one orifice (not the multi-orifice nozzle illustrated). Conventionally, prior art nozzles deliver a single, focused stream of gas and, thus, the nozzles are located below the rollers, i.e., further away from the glass surface, without a substantial negative impact to the lifting force. Additionally, because thicker glasses are less susceptible to deformation caused by air turbulence, gas flow does not have to be as carefully controlled to prevent interference from the rollers themselves. As such, prior art systems typically position the lift jet array below the conveyor such that the nozzles are below the rollers. This position corresponds to the initial installation position (position "b").

As such, according to various non-limiting embodiments, the lift jet array may be vertically adjustable, e.g., placed in position "b" and then elevated to position "a." For instance, in a non-limiting embodiment a screw-based mechanism may be utilized to slide one or more wedges under the array assembly, the array may be elevated, for example evenly elevated, to the desired height. The wedges may, in certain embodiments, be adjustable so as to allow adjustability of the lift jet array to different heights, depending on the dimensions of system in which it is implemented. Such a lifting mechanism of course is exemplary only and should not limit the scope of the claims appended herewith as any number of lifting mechanisms may be utilized with embodiments of the present disclosure. For example, in other embodiments, a lift may be installed beneath the lift jet array, such as beneath the floor, which may then lift a frame supporting the lift jet array to the desired height. Thus, in each of these embodiments, the lift jet array may be elevated at temperature, that is, the space (i.e., furnace or respective module containing the lift jet array) does not need to be reduced in temperature to raise or lower the lift jet manually or otherwise, and thus the associated system or bending lehr can be maintained at high efficiency and at temperature.

In various disclosed embodiments, each nozzle 250 may have a plurality of orifices, each of which delivers a stream of gas, thus distributing the lifting force over a wider surface area. If the gas flow from the nozzles 250 impinges on the rollers 210, this may cause turbulence and significantly reduce the lifting force. Accordingly, in various embodiments disclosed herein, the jet lift array may be positioned such that the tip 260 of each nozzle 250 is located between the rollers and above the centerline of the rollers 230. In such embodiments, the gas flow is not, or is not substantially, disrupted by the adjacent rollers 230.

Referring to FIGS. 3A-C, several views of a nozzle 350 according to various aspects of the disclosure are illustrated. FIG. 3A shows the nozzle 350 comprising a body 355 and a tip 360, the tip optionally having a plurality of orifices 365. The tip may be angled relative to the body at any suitable angle $\Theta°$. For example, $\Theta$ may range from about 5° to about 85°, such as from about 15° to about 70°, or from about 30° to about 60°, including all ranges and subranges therebetween.

FIG. 3B is a view of the nozzle 350 along the line A-A in FIG. 3A. This view provides a more detailed view of the orifices 365 located in the tip 360 of the nozzle. In the illustrated embodiment, the tip comprises six orifices; however, it is envisioned that various tips may comprise more or less orifices, such as two or more orifices, three or more, four or more, five or more, six or more, seven or more, or eight or more orifices. The nozzle 350 may further comprise at least one conduit, such as conduit 358 that passes through the body and tip of the nozzle, to deliver a plurality of streams of gas to a proximate thin glass sheet via the orifices 365.

FIG. 3C is a top view of the nozzle 350, illustrating the spacing of the orifices, which are, in at least this embodiment, evenly spaced along the circumference of the tip. Other configurations, including number, spacing, and/or distribution, are possible and within the scope of the instant disclosure. It should also be noted that these figures are not drawn to scale and any nozzle shape and/or size and/or orifice configuration may be employed in accordance with different aspects of the disclosure.

The nozzle design and placement according to the instant disclosure may thus provide an upward force over a greater surface area by replacing a single-opening nozzle with at least a portion of nozzles having multiple openings. The plurality of orifices may provide multiple gas streams in a pattern that diffuses the lifting force over a greater surface area. For instance, when placed approximately one inch from the surface of the glass sheet (approximating installation height), each nozzle may provide an upward force over an area with a diameter of about 1.5 inches, for instance, from about 0.5 to about 2 inches in diameter. When placed approximately 2 inches from the surface of the glass sheet (approximating shaping mold height), each nozzle may provide an upward force over an area with a diameter of about 4 inches, for example, from about 2 inches to about 6 inches in diameter. According to various embodiments, depending on the roller and nozzle configuration, the upward force from each nozzle may provide a nearly continuous coverage over substantially the entire surface of the glass sheet.

Accordingly, the lift jet array disclosed herein, and the systems and methods employing such a lift jet array, may also be used to shape glass sheets that are thinner than those shaped by current systems. For example, the methods and systems disclosed herein may be used to shape thin glass sheets having a thickness ranging from about 0.3 mm to about 3 mm, such as from about 0.5 mm to about 2 mm, or from about 0.7 mm to about 1.5 mm, including all ranges and subranges therebetween. Alternatively, the methods and systems disclosed herein may be used to shape thicker glass sheets, for example, sheets having a thickness greater than about 3 mm, such as greater than about 4 mm, or greater than about 5 mm.

Methods

According to the methods disclosed herein, a glass sheet may be conveyed along a plane on a roll conveyor comprising a plurality of rollers, the plurality of rollers having a centerline substantially parallel to the plane. In certain embodiments, the glass may be placed directly on the rollers which convey the glass sheet along a predetermined plane. The plane may, for example, be horizontal, but may also be at any other suitable angle, if desired.

The glass sheet is heated in any manner known in the art, for example, the sheet may be conveyed through a furnace or other heating device. Alternatively, the roll conveyor itself may be heated. In certain embodiments, the glass may be heated to a softening point, e.g., a point at which the sheet can be effectively molded into a new shape. According to various embodiments, the glass sheet may be heated to a temperature ranging from about 500° C. to about 1000° C., such as from about 600° C. to about 900° C., or from about 700° C. to about 800° C., including all ranges and subranges therebetween.

After heating, the glass sheet may be optionally conveyed to a position below a shaping mold. The shaping mold may have any shape and size suitable for producing a shaped glass product for a particular application. For instance, the shaping mold may be designed so as to impart a desired curvature to the glass sheet, for example, in the case of windshields and rear or side windows for an automobile. Other shapes and configurations are envisioned and within the scope of the application.

A lift jet array comprising a plurality of nozzles may be positioned below the glass sheet. One or more nozzles may comprise a plurality of orifices from which streams of gas may emanate to provide an upward lifting force capable of floating and lifting the glass sheet from the roll conveyor toward and/or up to the shaping mold. The gas streams may comprise, in certain embodiments, pressurized air, but may also include other suitable gases and mixtures of gases, such as inert gases, as desired and without limitation.

According to various embodiments, the gas flow may alone be sufficient to lift the glass sheet until it contacts the shaping mold. In other embodiments, the shaping mold may also comprise orifices through which a vacuum may be drawn to assist the transfer of the glass sheet from the roll conveyor to the shaping mold. In such cases, a stronger vacuum may be initially drawn to provide the initial support, and may be subsequently lessened to prevent deformation of the glass sheet at the vacuum openings.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a nozzle" includes examples having two or more such "nozzles" unless the context clearly indicates otherwise. Likewise, a "plurality" is intended to denote "more than one." As such, a "plurality of nozzles" includes two or more such nozzles, such as three or more such nozzles, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a system that comprises A+B+C include embodiments where a system consists of A+B+C and embodiments where a system consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method for shaping a glass sheet comprising:
   (a) conveying the glass sheet along a plane on a roll conveyor comprising a plurality of rollers, the plurality of rollers having a centerline substantially parallel to the plane;
   (b) heating the glass sheet;
   (c) positioning the glass sheet on the roll conveyor between a shaping mold and a lift jet array; and
   (d) lifting the glass structure from the roll conveyor by flowing a stream of gas from each orifice in the lift jet array,
   wherein the lift jet array comprises a plurality of nozzles, one or more of the plurality of nozzles comprising a tip having a plurality of orifices,
   wherein the lift jet array is positioned such that each nozzle tip is located above the centerline of the plurality of rollers, and
   wherein the stream of gas flows with a force sufficient to lift the glass structure from the roll conveyor.

2. The method of claim 1, wherein the glass structure is heated to a temperature ranging from about 600° C. to about 800° C.

3. The method of claim 2, wherein the glass sheet has a thickness ranging from about 0.7 mm to about 1.5 mm or from about 0.3 to about 1.5 mm.

4. The method of claim 1, wherein each nozzle comprises two or more orifices.

5. The method of claim 1, wherein each nozzle comprises six or more orifices.

6. The method of claim 1, wherein the stream of gas flow provides a force sufficient to lift the glass structure from the roll conveyor into contact with the shaping mold.

7. The method of claim 1, wherein the shaping mold comprises any one of:
   at least one surface for receiving and imparting a shape to the glass sheet; and
   a plurality of orifices through which a vacuum is drawn, and wherein the gas flow from the lift jet array and the vacuum from the shaping mold provide a combined force sufficient to lift the glass sheet from the roll conveyor into contact with the shaping mold.

* * * * *